United States Patent [19]
Eliassen

[11] 3,929,079
[45] Dec. 30, 1975

[54] TRANSPORT SYSTEM

[76] Inventor: Gunnar Thure Eliassen, Skolgatan 1, S-661 00 Saffle, Sweden

[22] Filed: June 17, 1974

[21] Appl. No.: 480,101

Related U.S. Application Data

[63] Continuation of Ser. No. 248,494, April 28, 1972, abandoned.

[30] Foreign Application Priority Data
Apr. 30, 1971 Sweden.............................. 5634/71

[52] U.S. Cl.............. 104/172 B; 104/48; 104/247; 193/35 SS
[51] Int. Cl.² .................. B65G 13/12; B61B 13/00; B60S 13/02
[58] Field of Search ............ 104/40, 130, 166, 168, 104/262, 265, 245, 247, 48, 172 R, 172 B; 193/35 SS

[56] References Cited
UNITED STATES PATENTS

| | | | |
|---|---|---|---|
| 1,825,468 | 9/1931 | Miller | 104/247 |
| 2,970,413 | 2/1961 | Miklosek | 104/48 |
| 3,011,665 | 12/1961 | Wise | 193/35 SS |
| 3,130,829 | 4/1964 | Long | 193/35 SS |

*Primary Examiner*—Drayton E. Hoffman
*Attorney, Agent, or Firm*—Sherman & Shalloway

[57] ABSTRACT

A transport or conveyor system for moving materials in a carriage or vehicle having wheels, adapted to ride on parallel rails comprising a parallel rail system including automatic switching, turning and stopping means; a plurality of drive chains or belts disposed between the parallel rails, and a carriage or vehicle adapted to ride on the parallel rails and convey loads of materials, the carriage including a body, rail wheels attached to the body, a carrier wheel to engage the drive chain or belt attached to the body and means for transmitting the motion of the drive chain or belt to the carriage.

3 Claims, 16 Drawing Figures

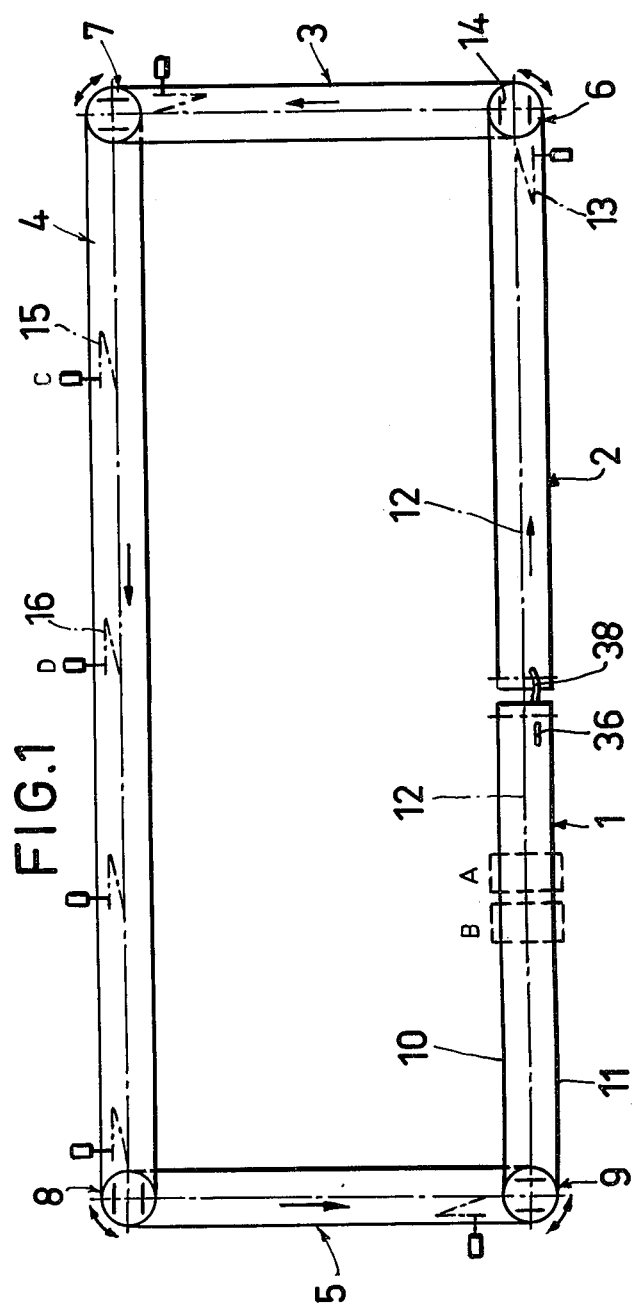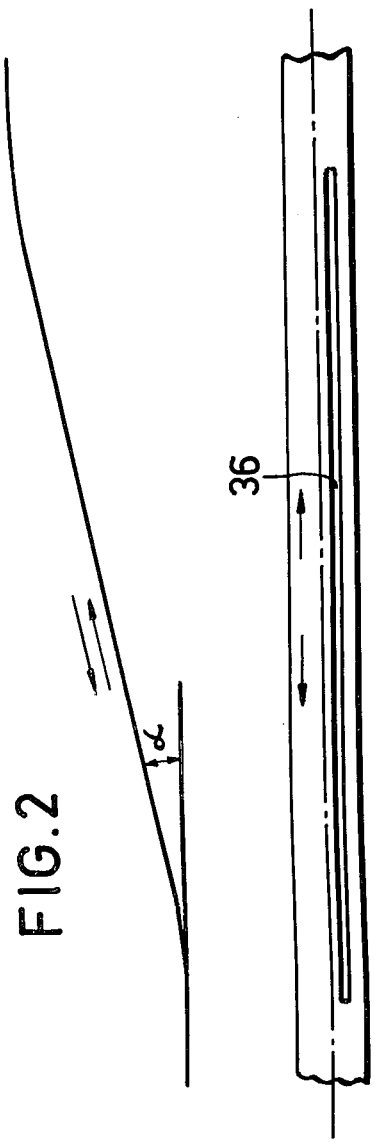

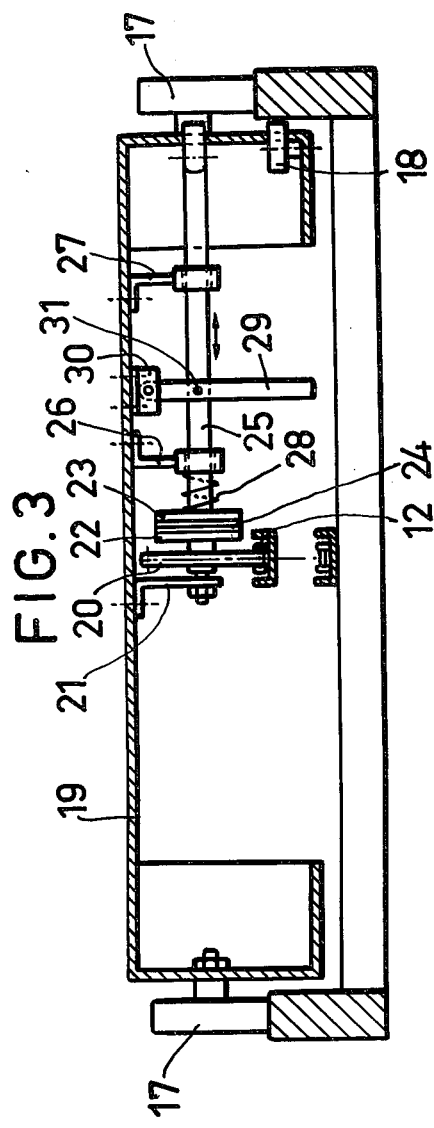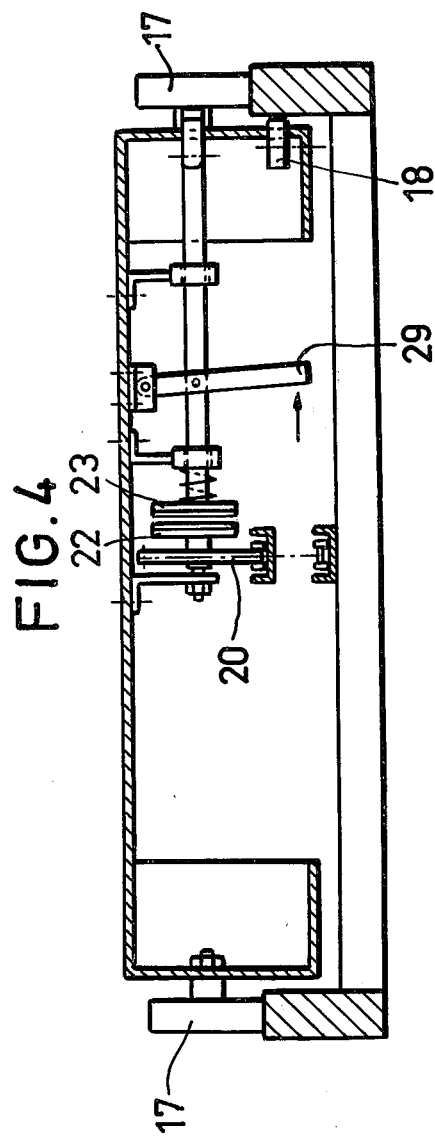

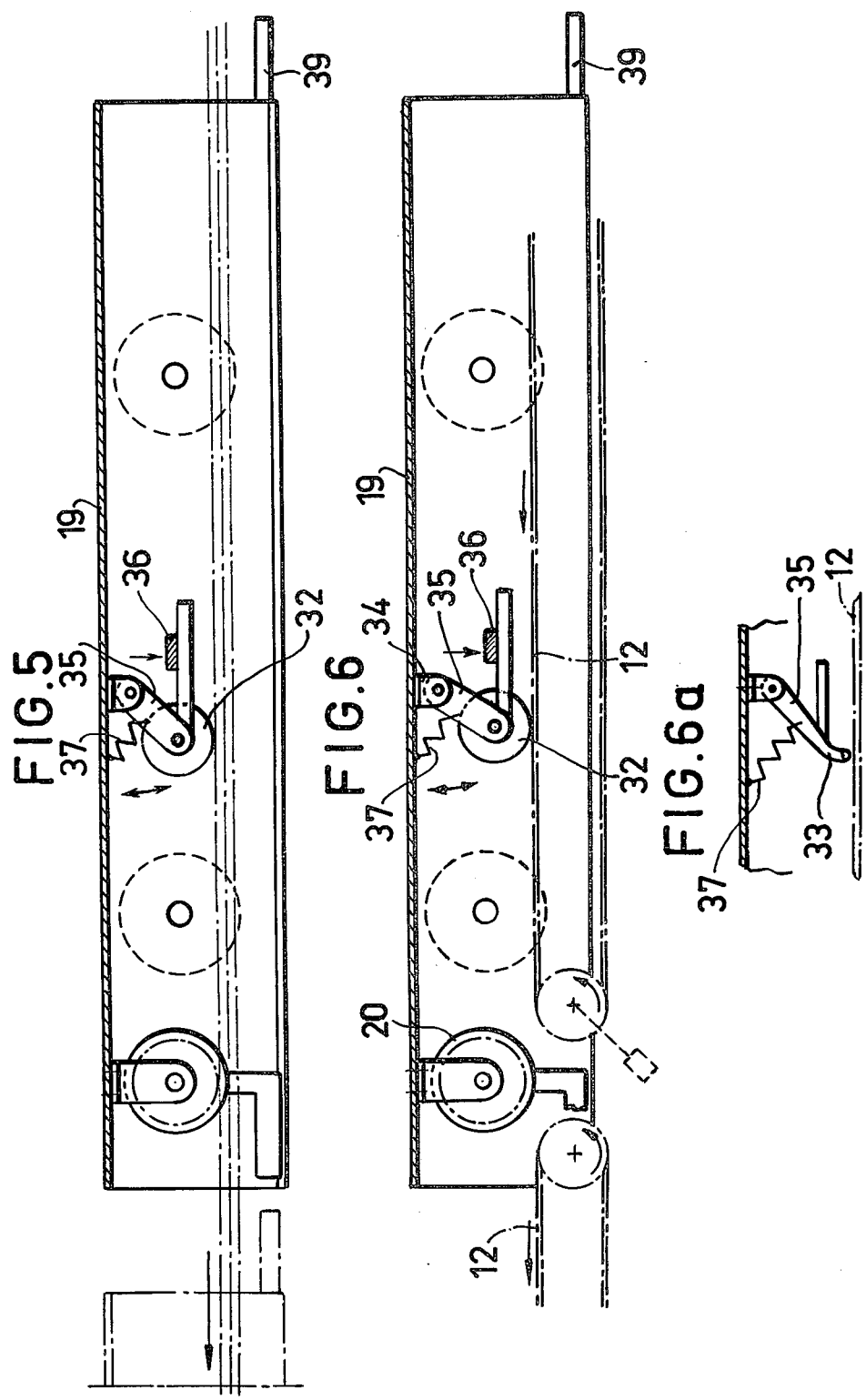

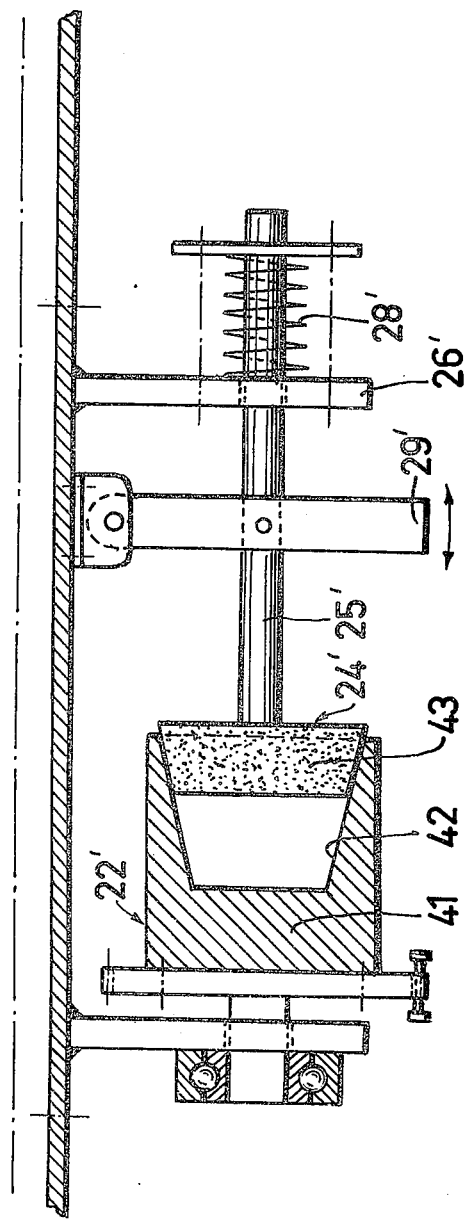

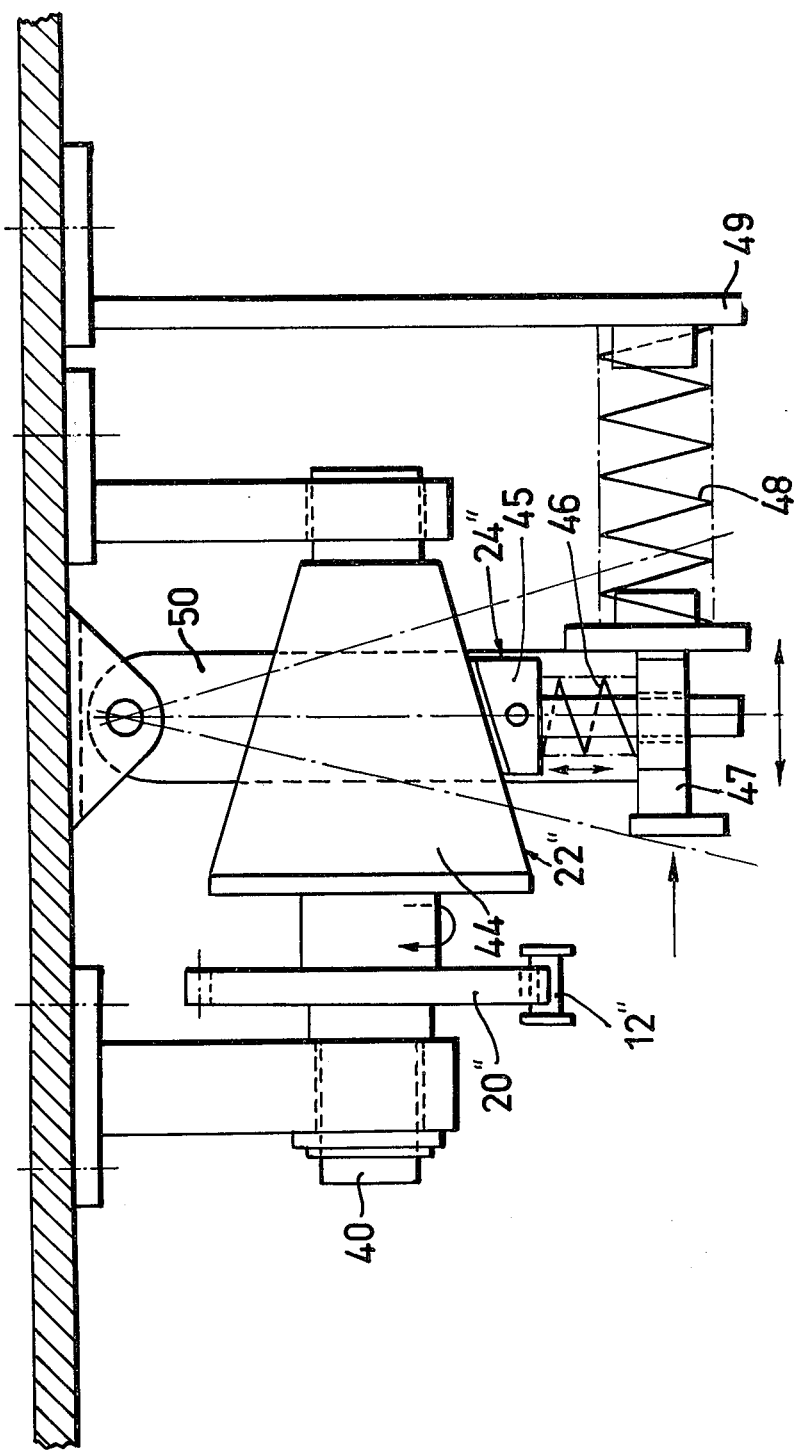

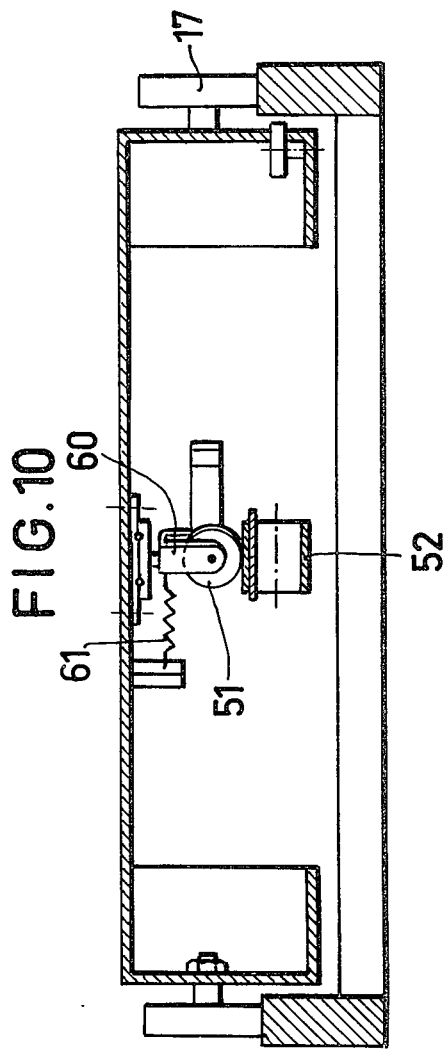
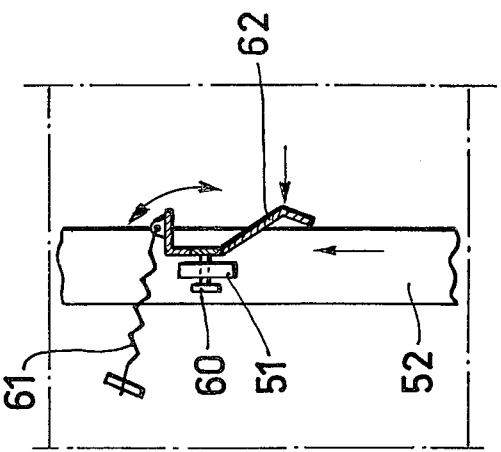
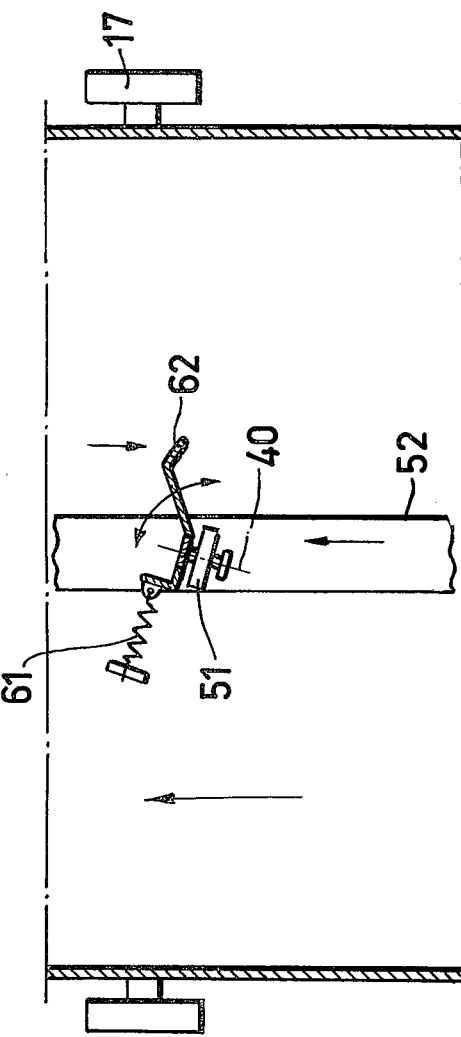

TRANSPORT SYSTEM

This is a continuation of application Ser. No. 248,494, filed Apr. 28, 1972, now abandoned.

The present invention relates to a transport system provided with at least one carriage for transport of material on a hauling track, which carriage has a rail wheel for carrying the carriage on a rail, and is adapted to cooperate with a continuously turning driving-device driven by a motor, for instance a chain which is in constant engagement with a carrier means or engaging member arranged on the underside of the carriage.

Transport systems of this type are previously known, for instance, in Swedish Pat. No. 216,503. They have i.a. the disadvantage that their carriages can only be transported on a rail track, which restricts their use. With such a system it is also difficult to stop softly and to stop its carriages. Sudden jerks occur upon starting as well as upon braking the carriages. These and other disadvantages of known transport systems have been eliminated with the present invention through substantially the following measures:

1. That the rail wheels of the carrier are located so that their periphery is within the profile of the overall height of the carriage.
2. The carrier engaging means of the carriage consist of a carrier wheel positioned within the profile of the carriage, for instance a chain wheel or sprocket.
3. The carrier engaging wheel is rigidly positioned on a shaft supported by a bracket connected with the carriage.
4. A device for connecting and disconnecting the carrier engaging means, which can be actuated by means of an operating device, is mounted on the carriage within its profile.

In this way it is also attained that the carriage of the transport system can be transported on a chain conveyor, a belt conveyor on a gravity roller conveyor and can easily be transferred from one conveyor to another of this type, as well as on rails.

Some embodiments of the invention are shown on the enclosed drawings where

FIG. 1 is a top view of a transport system of the invention,

FIG. 2 shows part of a transport system according to FIG. 1 including an inclined track, FIG. 3 is a side view of a carriage of the transport system in driving position, FIG. 4 shows the carriage according to FIG. 3 in stop position, FIG. 5 is a side view of the carriage according to FIG. 3 and a carriage in front of same.

Figure 7:
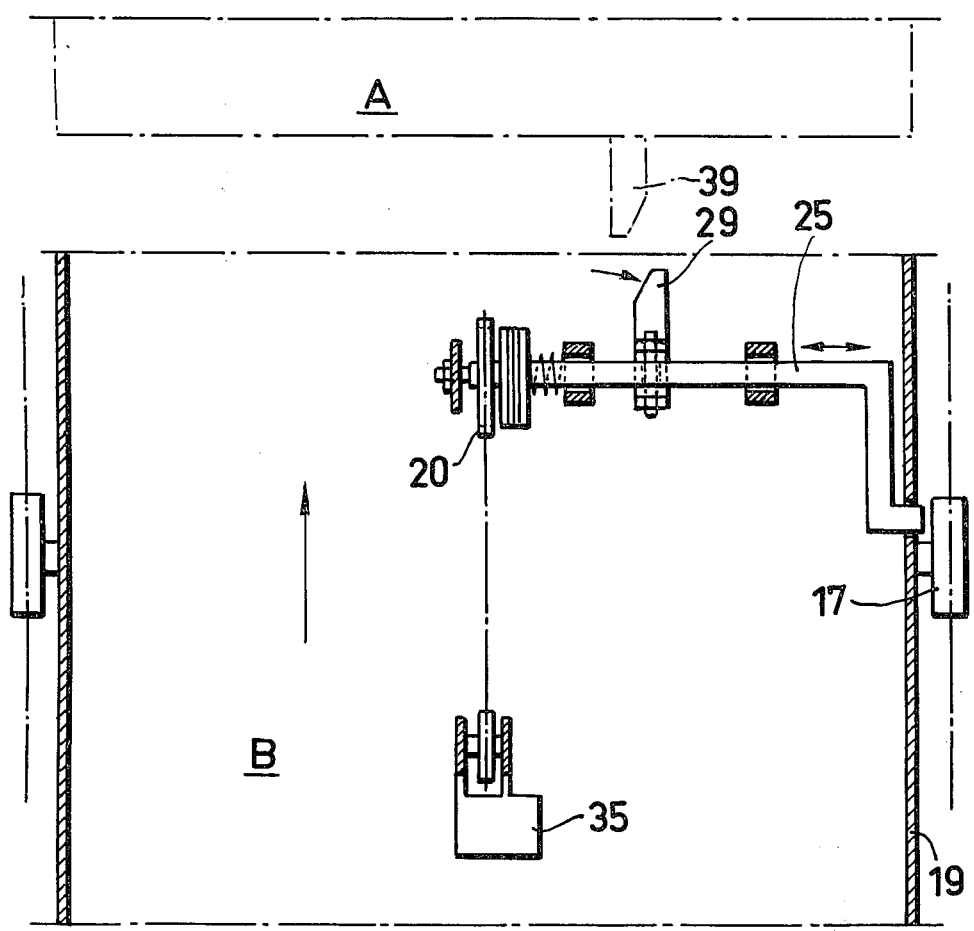
Figure 13:
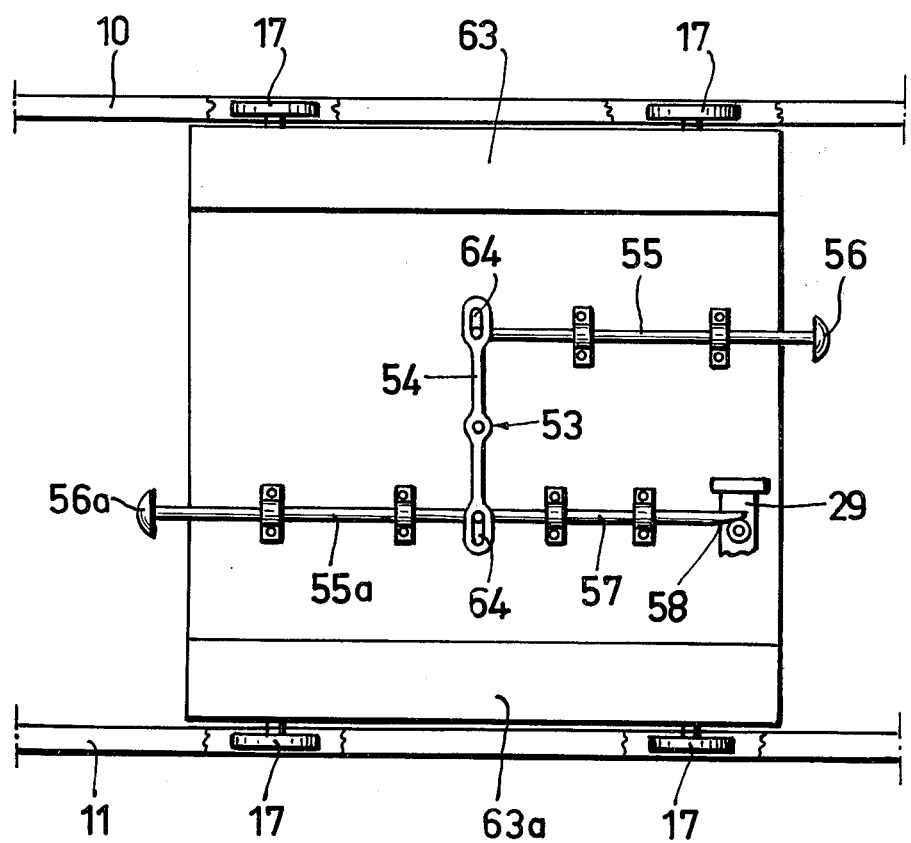

FIG. 6 shows the carriage according to FIG. 5 at a crossing between two parts of the track and FIG. 6a shows a detailed enlargement of a portion of this carriage, FIG. 7 shows how two carriages A and B running in the same direction are prevented from collision, FIG. 8 shows another design of a coupling device of the carriage, FIG. 9 shows a third design of the coupling device of the carriage, FIG. 10 is a side view of another embodiment of one of the carriages of the transport system, FIG. 11 is a top view of the carriage in FIG. 10 the section being somewhat over the center of the rail wheels, when the carriage is moving, FIG. 12 shows the carrier means of the carriage in FIG. 10 cooperating with the drive means, when the carriage is not moving and FIG. 13 shows the underside of the carriage with operating means for connecting and disconnecting the carriage when being carried along by the drive means.

THE TRANSPORT SYSTEM HAS THE FOLLOWING CHARACTERISTICS:

1. Relatively soft acceleration of the carriages.
2. Relatively soft retardation of the carriages.
3. The carriages can be stopped at the decided stop position.
4. The carriages can be automatically and reciprocally accumulated.
5. The carriages can be transported in the vertical plane and the ground plane and in either direction in an acute angle against the horizontal plane.
6. The carriages can be moved on rail, on a driven or undriven roller way and on a driven chain conveyor.
7. The carriages can be shunted or transferred from
   a. rail to roller way.
   b. rail to chain conveyor
   c. roller way to rail
   d. chain conveyor to rail
   e. roller way to chain conveyor
   f. chain conveyor to roller way
   g. rail to rail
8. The carriages can be stacked on each other, if required.

The carriages can be function controlled by means of
1. Escort memory on each carriage.
2. External or separate addressing system according to the principle
   a. The sequence of the carriages in the system must not be disturbed, or
   b. The sequence of the carriages in the system may be disturbed.
3. Indicating system with computer.

DESCRIPTION OF FUNCTION AND CONSTRUCTION OF THE SYSTEM

Suppose that two carriages A and B are to be transported one revolution in a system according to FIG. 1. The starting position of the carriages is shown in dotted lines in the figure. Suppose that the desired stop position of carriage A is at the station C and that of the carriage B is at the station D.

Design

The system comprises five rail conveyors 1, 2, 3, 4, 5 and four driven turntables 6, 7, 8, 9.

The rail conveyors comprise two parallelly running rails 10,11 11 and one continuously driven chain 12 located at the center of the two parallel rails. The conveyors are mounted directly on the floor by way of a stand or base. The rail conveyors of the turntables are of similar construction. The turntables 6–9 are constructed with a driven and revolving disk with rail conveyors. The object of the turntable is to transfer the carriages perpendicularly or at a certain angle from one rail conveyor to another.

According to FIG. 3 the carriage consists of at least four horizontally mounted rail wheels 17 and at least two guide wheels 18. The rail wheels and the guide wheels are rigidly connected to the carriages A and B. The wheels should be located so that their periphery is within the profile or limits of the overall height of the carriage so that no construction attached to the carriage, and which is directly associated with the speed control of the carriage and its drive, protrudes outside its overall height.

A carrier means or drive-engaging means, for engagement between a carriage and the drive chain 12, consists of a sprocket or chain wheel 20. The sprocket 20 is rotatably mounted and attached to the carriage A by means of a bracket 21. A first clutch or coupling member 22 is attached to the chain wheel 20. A pressure plate 23, which also carries a second coupling member 24, is rigidly connected to a coupling shaft 25. The coupling shaft 25 is freely mounted for reciprocation on brackets 26 and 27, which in their turn are rigidly connected to the carriage A. The coupling shaft 25 is reciprocable in its longitudinal direction by means of pressure springs 28 and an operating device in form of a lever 29.

The pressure spring 28 is clamped between the pressure plate 23 and the bearing bracket 26. The operating device 29 is mounted and moveable in the longitudinal direction of the coupling shaft 25 in a bearing bracket 30. The bearing bracket 30 is rigidly connected to the supporting surface 19. The coupling shaft 25 and the operating liner 29 are connected to each other by way of a pin or shaft 31, which is rigidly connected with the operating device 29 and freely rotatable in a hole through the coupling shaft 25 perpendicularly to its axis. The coupling shaft 25 is designed so that when the operating device 29 is moved to its extreme in one direction it locks the end of the coupling shaft 25 to one of the rail wheels 17 of the carriage. This locking should only take place when it is decided to stop the carriage. When driving the carriage, the chain wheel or sprocket 20 should be locked against rotation and rigidly connected with the chain 12 by way of the pressure spring 28 and the clutching action of the first and the second coupling members 22 and 24.

When the carriage A in FIG. 1 is to be transferred from the rail conveyor 1 to the rail conveyor 2 and the sprocket 20 (FIG. 6) leaves the chain 12 of the conveyor 1 for engaging the chain 12 of the conveyor 2, the carriage momentarily has no drive. In order to eliminate this, a special auxiliary driving device is mounted and rigidly adapted on the carriage. It consists of a lockable, auxiliary sprocket 32 (FIG. 5, FIG. 6) or a stationary pawl or hook 33 (FIG. 6a). The auxiliary sprocket 32 (or the hook 33) is mounted in a bearing bracket 34 by way of a lever 35. The bearing bracket 34 is rigidly connected with the carriage. The lever 35 is designed so that an external operating device 36 can actuate the lever as shown in FIG. 6.

In normal position this driving device is not in engagement with the drive chain. This is achieved by means of a tension spring 37, (see FIGS. 5–6). The tension spring 37 is rigidly secured between the supporting surface 19 of the carriage and the lever 35. At a definite position before the sprocket 20 leaves the rail conveyor 1, the operating device 36 actuates the lever 35 so that the auxiliary sprocket 32, or the hook 33, is engaged with the chain 12 of the rail conveyor 1. This driving device remains connected until the sprocket 20, (FIG. 6), is in engagement with the chain 12 of the rail conveyor 2. In order to make easy the engagement of the sprocket 20 with the chain 12 of the rail conveyor 2 the sprocket 20 should be unlocked or released. This is obtained by means of a fixed external means 38 (FIG. 1) which actuates the operating device 29 (FIG. 4) and displaces this from its normal position. Then the operating device 29 displaces the clutch or coupling shaft 25 enough so that an air gap appears between the first and the second coupling member 22 and 24, (i.e., the sprocket 20 rotates freely on its shaft). In this way the engagement of the lockable sprocket 32 or the hook 33 with the chain 12 of the rail conveyor 2 is facilitated. The external means 38 is to actuate the operating device 29 sufficiently long that a safe engagement takes place between the sprocket 20 and the chain 12 of the rail conveyor 2.

Then, the pressure spring 28 again displaces the coupling shaft 25 to its normal or starting position. In this way, clutching contact will occur between the first and the second coupling member 22 and 24 when the external means 38 no longer actuates the operating device 29. When transferring the carriage from one rail conveyor to another such operating devices 36 and an external means 38 for actuation of the drive means of the carriage are installed.

The carriage A will then get to the turntable 6 in FIG. 1. If the turntable 6 is in its neutral position, i.e., the rail conveyor 14 of the turntable is an extension of the rail conveyor 2, the carriage A is transferred from the rail conveyor 2 to the rail conveyor 14 of the turntable. The turntable 6 is then turned 90° so that the rail conveyor of the turntable is an extension of the rail conveyor 3. During this rotation, the carriage A is locked according to the above description of friction of the coupling shaft 25 and the operating device 29, and coupling shaft 24. During the rotation of the turntable, i.e., as long as the turntable is not in neutral position, a pneumatically controlled adjusting cam 13, FIG. 1, is in position of preparedness, i.e., it is prepared to stop the carriage B. This is made by the adjusting cam 13 actuating the operating device 29 of the carriage B and in this way displacing the coupling shaft 25 so that an air gap arises between the first and the second element 22 and 24 respectively, FIG. 4. The adjusting cam 13 is to be mounted in the system so that the carriage B is actuated by the adjusting cam 13 but not by the external means 38 located on the turntable 6.

The construction and function of the adjusting cam 13 is designed so that slipping arises between the first and the second coupling member 22 and 24 respectively so that soft retardation and acceleration result. The cam 13 is also designed so that the carriage is stopped by the contact the end of the coupling shaft 25 (FIG. 4), with the rail wheel 17. All the adjusting cams in the system should have the same construction and function as the described one.

In order that the carriage A, FIG. 1, might be displaced from the rail conveyor 14 on the turntable 6 to the rail conveyor 3, the external means 38 must be designed so that it is displaced either mechanically or with the operating device 29 returning to its normal position under the influence of the spring 28.

This external means is also designed so that stopping, deacceleration and acceleration of the carriage are achieved softly.

When the carriage A has entered the rail conveyor 3, the turntable 6 returns automatically to its normal position. The external means 38 also returns to its neutral position.

When the turntable 6 is in normal position, the adjusting cam 13 is to return to its neutral position, (i.e., the carriage B is to accelerate and be displaced to the turntable 6, FIG. 1). The carriage B then gets the same cycle of operation as the carriage A.

The carriages A and B have the same cycle of operation at the turntable 7 (FIG. 1) as at the turntable 6.

The carriage A is to be stopped, according to the program, at the station C of the rail conveyor 4. The electrically and pneumatically controlled adjusting cam 15 gets its controlling impulse from one of the function control systems listed in the assumptions above.

The adjusting cam 15 has the same cycle of operation as the adjusting cam 13. Suppose that the carriage A is left at the station C and that the carriage B has entered the rail conveyor 4 and approaches the carriage A (see FIG. 1). At the rear end of the carriage A and at all the carriages as seen in the direction of travel an operating device 39 is mounted (see FIG. 6) which is designed so that it actuates the operating device 29 of the carriage behind (see FIG. 7).

The operating device 39 is designed so that the carriage B gets a soft retardation and its sprocket 20 is disconnected. Suppose that the adjusting cam 15 returns to its neutral position. Then the sprocket 20 of the carriage A is connected so that the carriage A begins to move. Then the carriage A is displaced from the rail conveyor 4 to the rail conveyors 5 and 1 by the turntables 8 and 9. The same cycle of operation as for the turntable stops the carriage B according to the program at the station B with an adjusting cam 16. After the finish of work of the carriage B, at the station D, the carriage B gets the same course of motion as the carriage A.

FIG. 2 shows how the system is designed for transport of a carriage angularly with respect to the ground plane (inclination = pitch). To get a safe transport, the blocked auxiliary sprocket or the tow hook 33, should be connected as long as the carriage is on the gadient plane. This is achieved by making the length of the external operating device 36, which actuates the lever 35, at least as long as the length of the gradient plane, as shown in FIG. 2.

Figure 14:
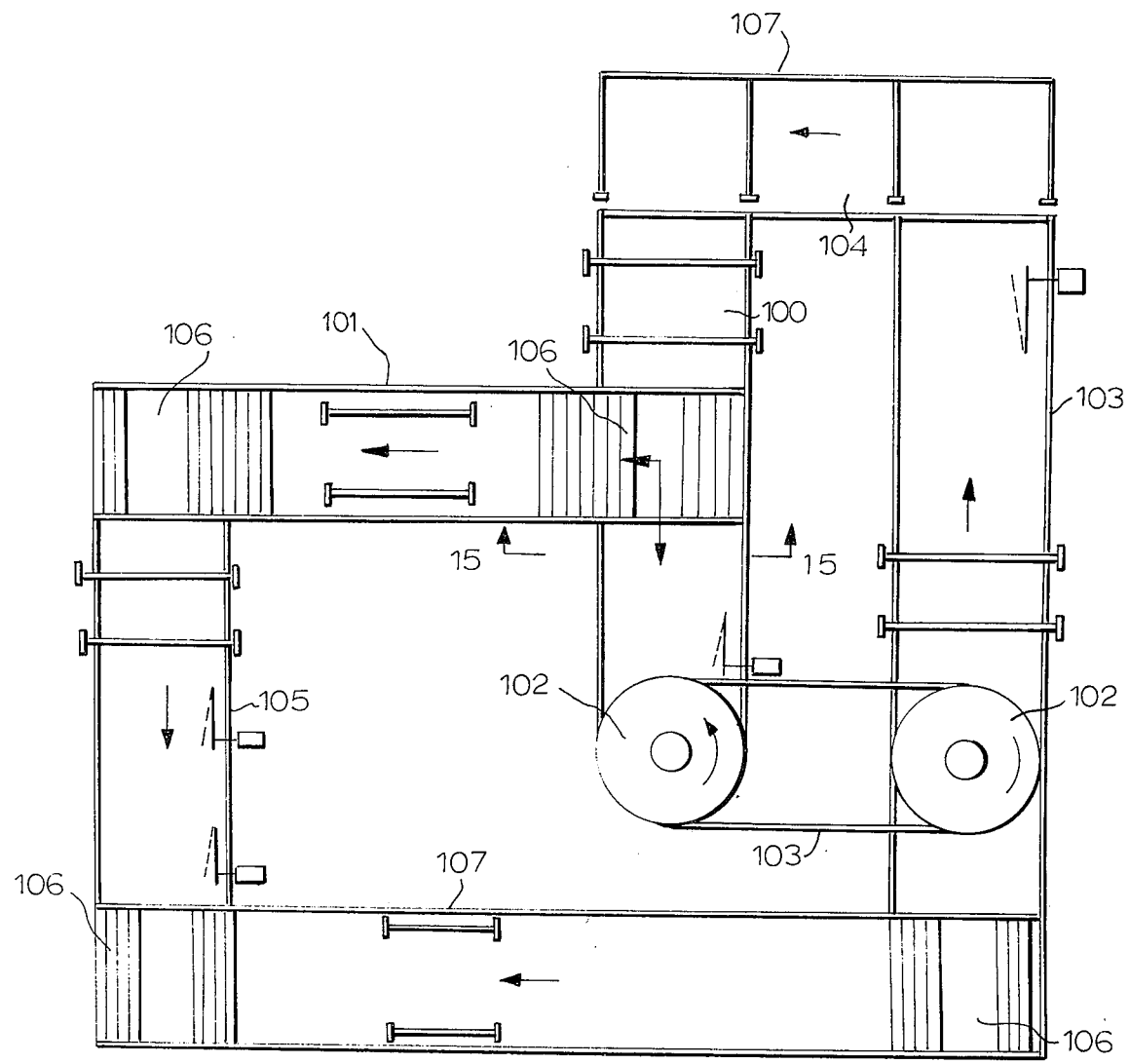
Figure 15:
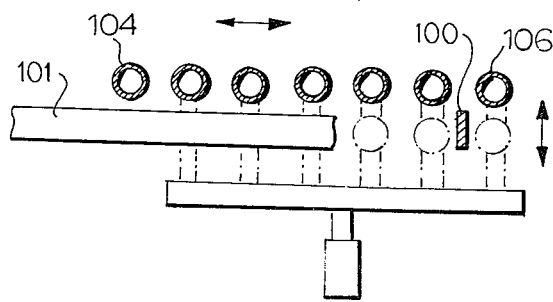

FIG. 14 shows an example of how the carriages can be shunted from one transport system to another by means of a vertically adjustable rollerway switch shown in a section 15-15 of FIG. 14 shown as FIG. 15.

From one rail conveyor 100 the carriage can be moved to the rollerway 101 or continue straight away to a turntable 102. By way of this turntable 102 and a rail conveyor 103 and a second turntable 102 the carriage can be transferred to a rail conveyor 103. From this conveyor the carriage can be moved by way of a chain conveyor 104, which can be provided with two parallel rails and two longitudinal chains. The centre distance between the two parallel rails is as big as the centre distance of the rail included in the rail conveyors 100 and 103 so that the carriage can be transferred to the rail conveyor 100. From the rollerway 101 the carriage can be transferred to a rail conveyor 105 by way of a first switch 106. From this the carriage can be transferred by way of a second switch 106 to a chain conveyor 107. From this conveyor the carriage can be transferred to a rail conveyor 103 by way of a third switch 106 etc.

The aforesaid coupling members 22 and 24 form together with the coupling shaft 25 an easily clutch or coupling which, in FIGS. 8 and 9 of the drawings, is shown in two different designs, or alternate embodiments.

The coupling of FIG. 8 consists of a first coupling member 22' formed like a cup 41 and a second coupling member 24' formed like a steel-brush 43 attached to the end of the interior end of the coupling shaft 25'. The part 41 has an interior, tapered surface 42 for cooperation with the steel-brush part 43. The latter part 43 is attached to a coupling shaft 25' displaceable in a bracket 26', the coupling shaft being displaceable against the effect of a pressure spring 28' with an operation device 29' which is attached to the carriage A, B. The coupling according to FIG. 10 consists of a first coupling element 22'' designed as a conical roller 44 and a second coupling member 24'' formed as a coupling block 45. The roller 44 is attached to the shaft 40 carrying a sprocket 20'', which is in constant engagement with the constantly driven chain 12''. The coupling block 45 is displaceably adapted along the periphery of the roller 44 by means of an operating sleeve 47, which is moveably adapted against the effect of a spring 48 attached to a bracket 49 on the carriage A, B and is pressed against the roller 44 by means of a resilient means 46. The coupling block 45 is hinged to a rod 50 revolvingly attached to the carriage A, B. By means of the described embodiments of the transport system, with a chain as drive means for the carriage, the carriage can reach a speed of 30m/m. When there is a need for a greater speed, the embodiment shown in FIGS. 10–12 is suitable. By this embodiment it is possible to reach a speed of 80–90m/m.

In the carriage shown in FIGS. 10–12 the carrier engaging means of the carriage consists of a rubber wheel 51. The drive means of the carriage consists of a constantly running, endless, relatively narrow conveyor belt 52 driven by a motor. The rubber wheel 51 is in constant engagement with the conveyor belt 52.

When the carriage is to be driven, the rubber wheel 51 is skewed or tilted relative to the direction of motion of the conveyor belt 52, as shown in FIG. 11. When the rotational shaft 40 of the rubber wheel 51 is parallel to the direction of motion of the conveyor belt, the rubber wheel 51 is quite still and carries the carriage so that it is transported at the same speed as the conveyor belt 52.

The carriage stops by turning of the rubber wheel 51 so that its axis of rotation 40 is perpendicular to the direction of motion of the conveyor belt 52, as shown in FIG. 12.

The shaft of the rubber wheel 51 is carried in a fork-shaped bracket 60, which is rotatably attached to the carriage. An operating lever 62 for turning the rubber wheel 51 is attached to the bracket 60. The operating lever 62 is rotatable against the effect of resilient means or spring 61, which is clamped secured between the carriage and one end of the operating level 62, which protrudes in one direction from the bracket 60. The other end of the operating lever protrudes in the opposite direction from the bracket 60.

When the operating lever 62 is turned, for instance by an adjusting cam 15 or 16 (FIG. 1) in the transport system, to the position shown in FIG. 12, the rubber wheel 51 is turned so that it runs freely on the conveyor belt 52. In this way the carriage is at a standstill. When the carriage is again to be moved, the adjusting cam 15 or 16 is brought out of engagement with the operating lever 62, which by actuation of the resilient means 61 is turned to the position shown in FIG. 11. In this way, the rubber wheel 51 is turned so that it is placed angularly to the conveyor belt. The carriage will then successively start to move.

In FIG. 13, an impact or collision means 53 on the carriage is shown for operation of the operating means 23, which connects and disconnects the sprocket 20. This impact means 53 can also be designed to actuate the operating lever 62 of the rubber wheel 51.

This impact means 53 consists of a lever 54 with two arms rotatably mounted on the underside of the carriage. At both ends of the lever 54 a slit 64 is formed, in which one end of an impact rod 55 or 55a displaceably mounted to the carriage is rotatably and displaceably attached. The impact rods 55 and 55a protrude at the front and rear side of the carriage and are provided with operating pads 56 and 56a, respectively which are actuated by other carriages. At one of the ends of the lever 54 also one end of a coupling rod 57, displaceably mounted on the carriage, is rotatably and displaceably secured. The other end of the coupling rod 57 is provided with a wedge 58, conically widened towards the lever 54. This wedge 58 cooperates with the device for connecting and disconnecting the carrier means of the carriage, for instance the operating device 29 of the coupling device of the sprocket 20.

When a carriage, in its motion on a rail conveyor 1–5, collides with another carriage, which has, for instance, stopped before a station on the rail conveyor, this carriage presses in the operating pad 56 or 56a of the carriage behind, so that this is stopped. In this way it is possible to collect several carriages before a station and to have them automatically form a queue of carriages, in which they are displaced one carriage length, when a carriage leaves the queue.

In order that it should be easy, by means of the transport system of the invention, to move a carriage to the side on a roller way transverse to a rail conveyor the underside of the carriage, along the sides of the carriage where the rail wheels 17 are attached, is provided with longitudinal contact surfaces 63 63a secured on the carriage and having such a width that at least 2 rollers on such a roller way simultaneously make contact with the contact surface 63 or 63a. Alternatively, such contact surfaces can be located on another part of the underside of the carriage.

In order to insure that the sprocket 20 of the carriage shown in FIG. 3–9 is kept in constant engagement with the chain 12, the sprocket 20 and the clutch device for connecting and disconnecting same can be formed as a unit resiliently attached to the carriage, so that the sprocket 20 is always maintained pressed against the chain 12. This resilient attachment is not shown in the drawings.

In order to make it possible to transport the carriage manually for instance when there is no current, it has appeared to be suitable to attach a lockable handspike to the device 29 for connecting and disconnecting the carrier means, although this is not shown in the drawings. A similar lockable handspike can also be adapted for manual connection and disconnection of the other carrier means. This also has not been shown in the drawings.

It has also appeared to be suitable to build the supporting surface 19 of the carriage from relatively wide beams of box-type profile transverse with regard to the rails 10, 11 and to provide the underside of the carriage with weaker beams of U- or L-profile parallel to the rails 10, 11, although this also has not been shown on the drawings. In this way it is easy to stack the carriages in and on each other, if required.

I claim:
1. A system for transporting, comprising:
   a. a guideway including
      at least one pair of horizontally spaced parallel tracks; and
      a rollway having rollers intersecting said tracks from a position lower than said tracks to a position higher than said tracks; and
   b. a carriage including
      wheels for engaging said track to allow said carriage to advance along said tracks;
      a planar portion extending parallel to the rotational axes of said wheels in a plane beneath said wheels, said planar portion having a width less than the space between the parallel tracks and being engaged by the rollers to lift the carriage from said tracks so that the carriage may roll along the rollway at an angle to said tracks,
      a chain positioned between said tracks for conveying said carriage therealong;
      sprocket means on said carriage for engaging said chain;
      uncoupling means for disengaging said sprocket from said chain; and
      said sprocket means and said uncoupling means being positioned above said planar portion so as not to engage said rollway.

2. The system of claim 1, wherein the tracks extend through and past said rollers where said rollers intersect the tracks.

3. The system of claim 1, wherein the guideway includes at least one additional pair of spaced parallel tracks intersecting and extending at an angle to said initially recited track and wherein said guideway further includes a rotatable turntable disposed between both pairs of tracks, said turntable engaging the planar surface of said carriage to rotate said carriage to align the wheels of said carriage with the additional pair of tracks so said carriage rolls along the additional pair of tracks.

* * * * *